O. JUNGGREN.
ELASTIC FLUID TURBINE.
APPLICATION FILED DEC. 4, 1917.
1,267,229.
Patented May 21, 1918.
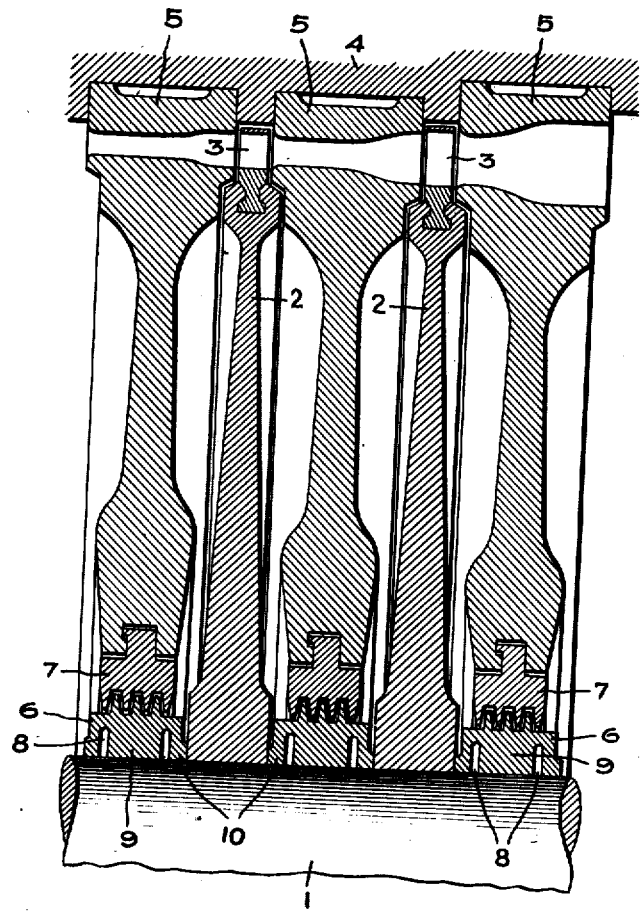
Inventor:
Oscar Junggren,
by Albert S. Davis
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,267,229.   Specification of Letters Patent.   Patented May 21, 1918.

Application filed December 4, 1917. Serial No. 205,455.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic fluid turbines such as comprise a plurality of bucket wheels mounted in spaced relation on a shaft with nozzle diaphragms between them which divide the turbine into stages.

In such turbines it is customary to provide bushings on the shaft between the wheels, which bushings serve to maintain the wheels in correct spaced relation to each other. The nozzle diaphragms surround these bushings, a suitable packing being provided between the outer surfaces of the bushings and the bores of the diaphragms.

In operation, elastic fluid turbines are subjected to substantial temperature changes when starting up, and when changes in load occur and it is found that the wheel hubs respond more quickly to these changes than does the heavy shaft, and that they therefore expand more quickly. As a consequence there is a tendency for the hub to expand along the shaft.

The object of my invention is to provide an improved bushing for spacing the wheels apart which is flexible to a sufficient extent to permit of the unequal expansion of the wheel hubs and the shaft.

For a consideration of what I believe to be novel and my invention, attention is directed to the accompanying specification and the claims appended thereto.

In the drawing, the figure is a radial sectional view of a portion of an elastic fluid turbine embodying my invention.

Referring to the drawing, 1 indicates a turbine shaft having wheels 2 thereon which carry buckets 3. 4 indicates the turbine casing in which are supported the nozzle diaphragms 5. Located on the shaft 1 between the hubs of the turbine wheels 2 are spacing bushings 6 and between the surfaces of such bushings and the bores of the nozzle diaphragms are suitable packings 7, conventional packings of the labyrinth type being shown in the present instance. The bushings 6 are in the form of rings and are provided with one or more annular grooves 8 which extend from the bore of the rings toward the outer surface. These grooves render the bushings 6 more or less flexible, as is obvious. I preferably employ two grooves 8, one adjacent each end of the bushing 6, thus forming a central portion 9 to which are integrally connected two outer ring portions 10. With this arrangement when the wheel hubs expand they may move relative to the shaft, the outer ring portions 10 being squeezed in toward the central portions 9.

This arrangement has the advantage that it permits the wheel hubs to expand equally in both directions and that when they contract the bushings will come back to their original positions. The wheels are thus maintained correctly spaced along the shaft and are prevented from creeping or being displaced longitudinally of the shaft.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In an elastic fluid turbine, the combination of a shaft, wheels thereon, and bushings which are flexible in an axial direction located on the shaft between the wheels to space the wheels apart.

2. In an elastic fluid turbine, the combination of a shaft, wheels thereon, and bushings which are located on the shaft between the wheels to space the wheels apart, each bushing comprising a central portion and two outer portions spaced from the central portion and connected thereto.

3. In an elastic fluid turbine, the combination of a shaft, wheels thereon, and bushings adapted to yield in an axial direction located on the shaft between the wheels to space the wheels apart, said bushings comprising annular rings provided with grooves which extend from the bore radially outward toward the outer surface.

4. In an elastic fluid turbine, the combination of a shaft, wheels thereon, and flexible bushings located on the shaft between the wheels to space the wheels apart, said bushings comprising annular rings each of which is provided with two grooves, one adjacent each end, which extend from the bore radially outward toward the outer surface.

In witness whereof, I have hereunto set my hand this 3rd day of December 1917.

OSCAR JUNGGREN.